May 17, 1960  J. M. EITEL  2,936,847
MOBILE LIFTING EQUIPMENT WITH EXTENSIBLE BOOM STRUCTURE
Filed Feb. 2, 1959  7 Sheets-Sheet 2

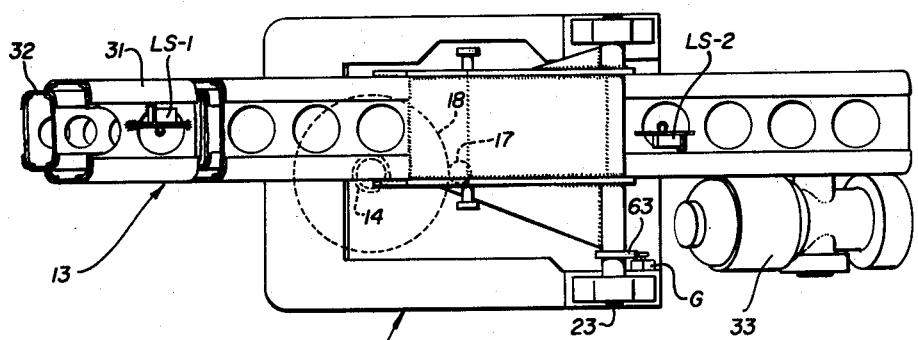
Fig. 2
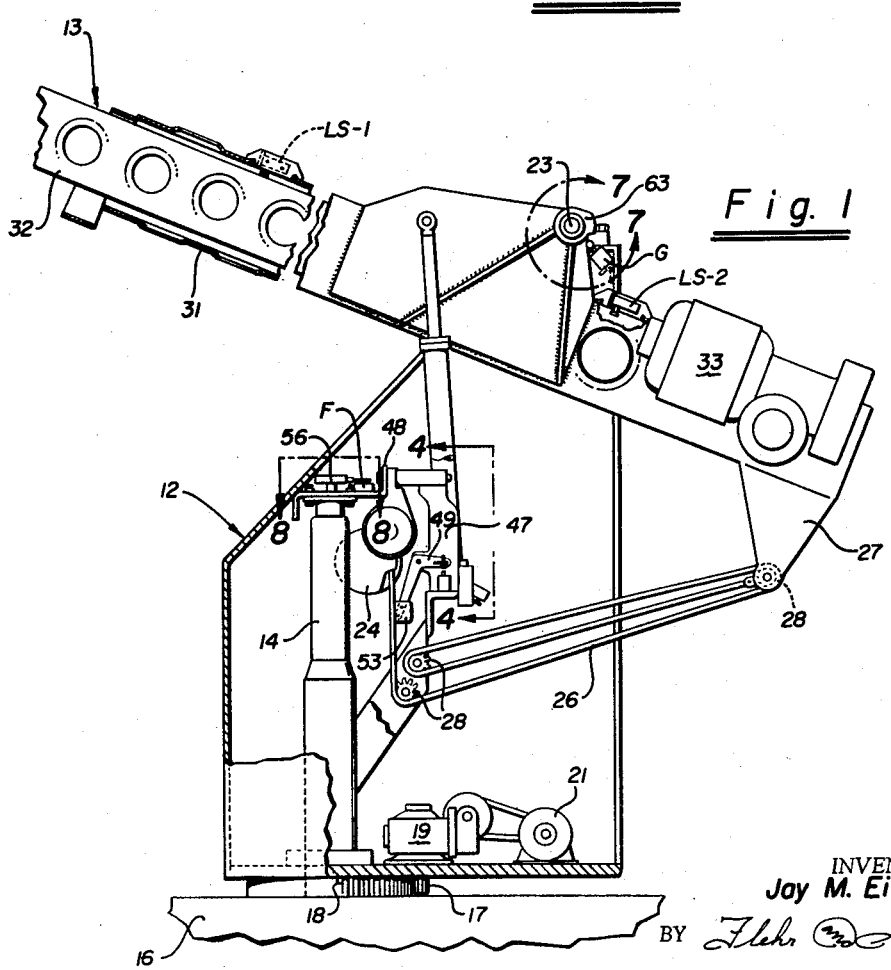
Fig. 1
INVENTOR.
Jay M. Eitel
BY 
Attorneys

INVENTOR.
Jay M. Eitel
BY
Attorneys

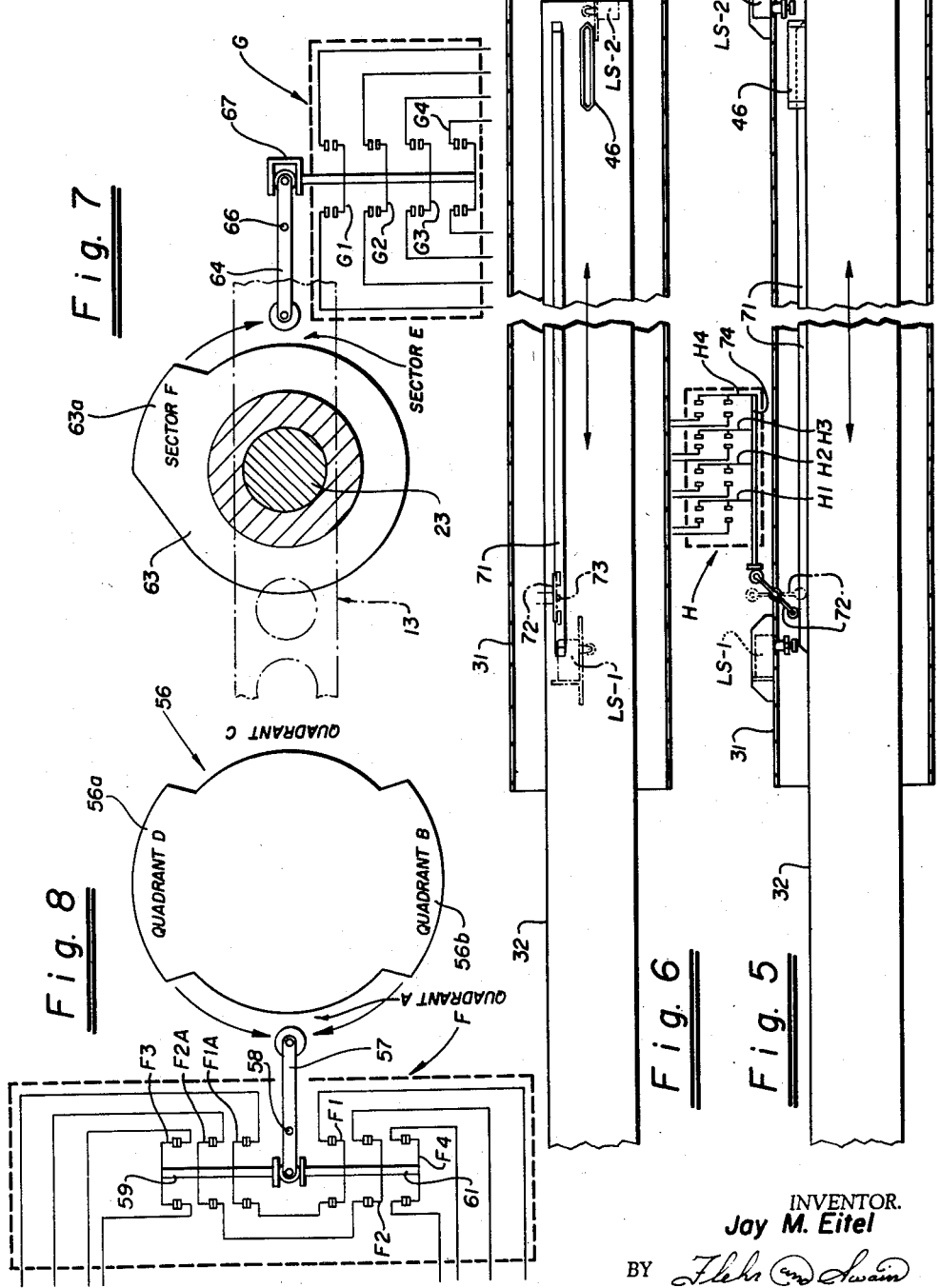

INVENTOR.
Jay M. Eitel

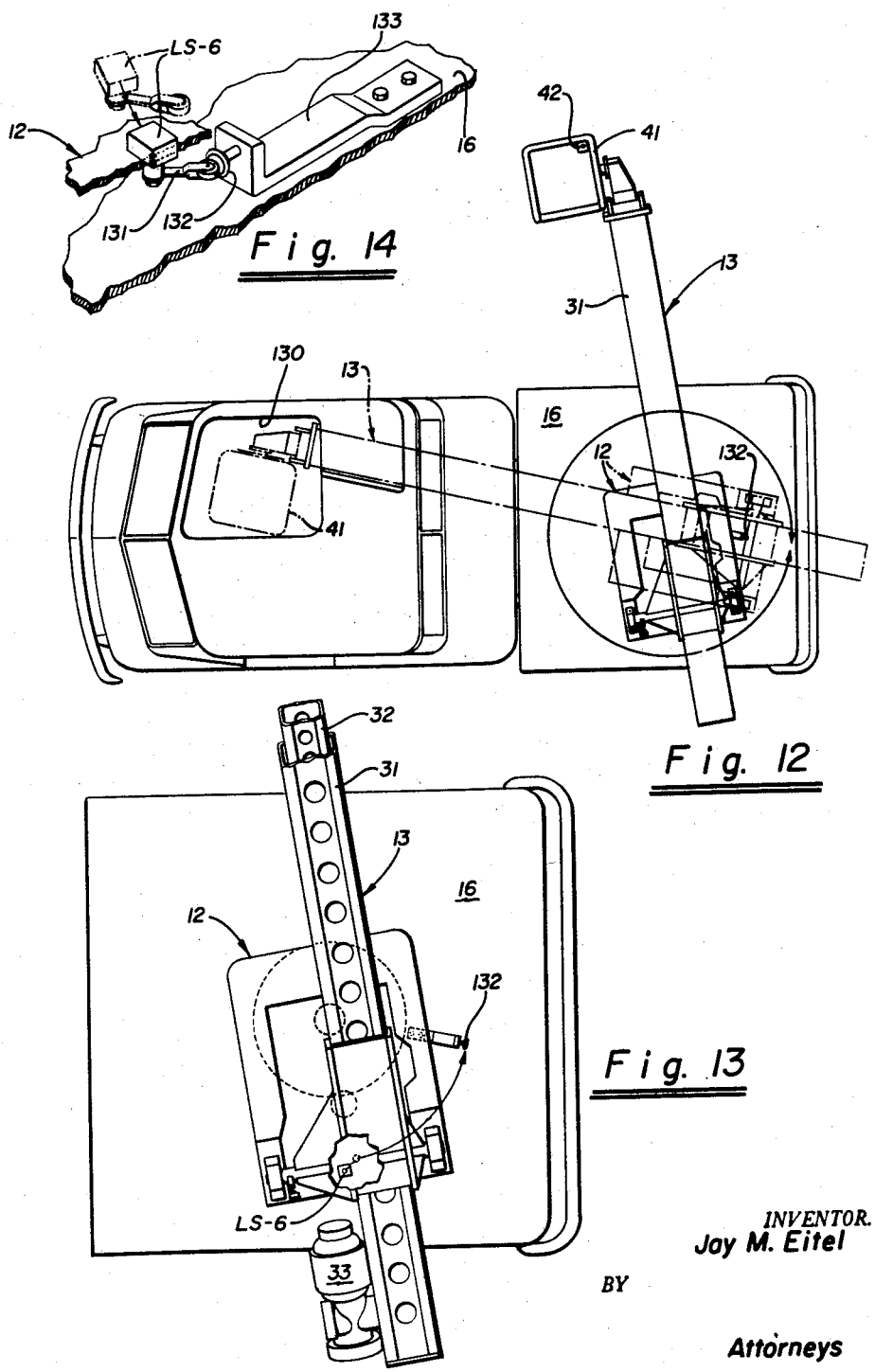

United States Patent Office 2,936,847
Patented May 17, 1960

2,936,847

MOBILE LIFTING EQUIPMENT WITH EXTENSIBLE BOOM STRUCTURE

Jay M. Eitel, Los Altos, Calif.

Application February 2, 1959, Serial No. 790,622

7 Claims. (Cl. 182—2)

This invention relates generally to a mobile lifting equipment with an extensible boom structure. More particularly, it relates to the type of lifting equipment in which the bottom structure can be raised and lowered, rotated clockwise and counterclockwise, and extended and retracted.

Heretofore in such lifting equipments, it has been necessary to limit the maximum length or distance to which the extensible boom can be extended to prevent the vehicle from tipping over. This has been particularly true when the boom structure is moved to the side of the vehicle. In the past, in order to make it possible to use a boom structure which can be extended a relatively long distance, outriggers have been utilized on the truck to prevent it from tipping over. However, the use of outriggers prevents movement of the vehicle. To permit movement of the vehicle with the boom structure extended, I have found it desirable to utilize a torsion bar suspension system as disclosed in my Patent No. 2,841,404. However, even such systems are inadequate to prevent the vehicle from tipping over in all positions of the boom structure where boom structures extendible to great lengths are required, as for example, in washing insulators on high voltage transmission lines. There is, therefore, a need for a mobile lifting equipment which has an extensible boom structure which can be extended to great lengths and which can still be used safely without danger of tipping over the vehicle.

In general, it is, therefore, an object of the present invention to provide a mobile lifting equipment with an extensible boom structure which can be extended to great lengths and which still can be used safely without danger of tipping over the vehicle.

Another object of the invention is to provide a mobile lifting equipment of the above character in which control means is provided to prevent movement of the boom structure into zones or sectors which would cause tipping over of the vehicle.

Another object of the invention is to provide a mobile lifting equipment of the above character which prevents movement of the boom structure into certain zones or sectors unless the boom structure has been retracted into a safe operating zone.

Another object of the invention is to provide a lifting equipment of the above character in which rotation of the boom structure is halted at a predetermined angle when the boom structure has been extended beyond a predetermined distance.

Another object of the invention is to provide a lifting equipment of the above character in which the boom structure can be rapidly and readily returned to its normal resting or home position.

Another object of the invention is to provide a lifting equipment of the above character in which rotation of the boom structure beyond certain angular positions is prevented.

Additional objects and features of the invention will appear from the following description in which the preferred embodiments have been set forth in detail in conjunction with the accompanying drawings.

Referring to the drawings:

Figure 1 is a side elevational view of a portion of the lifting equipment, partly in cross section, incorporating the present invention.

Figure 2 is a plan view of the lifting equipment shown in Figure 1.

Figure 5 is a side elevational view, partly in cross section, of a portion of the boom structure.

Figure 6 is a plan view, partly in cross section, of the boom structure shown in Figure 5.

Figure 7 is a schematic illustration of the elevation cam and the switch it operates.

Figure 8 is a schematic illustration of the azimuth cam and the switch it operates.

Figure 12 is a plan view of a mobile lifting equipment with an extensible boom structure incorporating another embodiment of my invention.

Figure 13 is an enlarged plan view of the boom structure and associated equipment.

Figure 14 is a detailed view of the switch and operating cam utilized in this embodiment of my invention.

Figure 3:
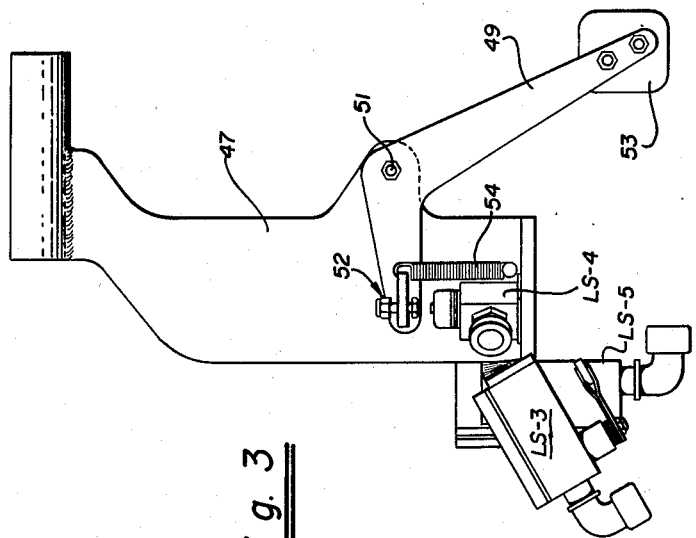
Figure 3 is an enlarged side elevational view of a portion of the lifting equipment shown in Figure 1.
Figure 4:
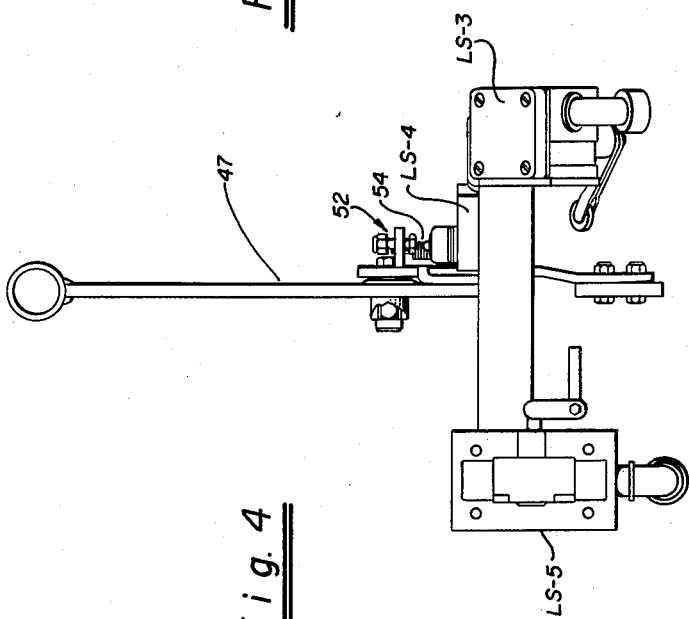
Figure 4 is a top plan view of the portion of the lifting equipment shown in Figure 3.

In general, the present invention consists of a lifting equipment which is mounted on a wheeled vehicle. The lifting equipment consists of a lift supporting structure and a boom structure mounted on the supporting structure. The supporting structure and the boom structure is of a type in which the outer end of the boom can be raised and lowered, rotated clockwise and counter-clockwise and extended and retracted. Control means is provided to prevent downward movement of the boom structure below a certain angle when the boom structure is in certain danger sectors or zones until the outer end of the boom is retracted a predetermined distance. This control means also includes means for preventing rotation of the boom structure into such danger sectors until the outer end of the boom has been retracted so that it is within a safe distance from the lift supporting structure. In addition, the lifting equipment may be provided with control means which, when the boom structure is completely retracted, will halt rotation of the boom structure at a predetermined angle. This last named control means makes possible the return of the boom structure to its home position very rapidly and accurately. If desired, additional control means may also be provided to prevent rotation of the boom structure and the lift supporting structure into a certain sector.

The lifting equipment, as illustrated in the drawings, is mounted upon a self-propelled vehicle 11, as disclosed in my Patent No. 2,841,404. The lifting equipment is mounted on the vehicle in a position generally overlying the rear wheels for rotation about a vertical axis. It consists of a load supporting structure 12 and a boom structure 13.

The load supporting structure 12 and the boom structure 13 can be of any suitable type as long as the outer end of the boom structure is capable of being raised and lowered, rotated clockwise and counter-clockwise, and extended and retracted. A load supporting structure and a boom structure found to be satisfactory for such a purpose is shown in the drawing. The load supporting structure 12 is rotatably mounted on a vertical stud shaft 14 fixed to the frame 16 of the vehicle. The load supporting structure is rotated by a pinion 17 which engages a large gear 18 fixed to the stud shaft 14. The pinion is rotated by a speed reducer 19 driven by a reversible motor 21. As the motor 21 rotates, the load supporting structure 12 is rotated about the stud shaft 14 and the large gear 18.

The boom structure 13 is pivotally mounted for rotation about a horizontal axis by a large pin 23 carried by the load supporting structure 12. The outer end of the boom structure is adapted to be raised and lowered and pivoted about the pin 23 by a hoist unit 24 mounted on the load supporting structure which reels in and out an elongate element 26 in the form of a chain which has its other end secured to the tail 27 of the boom structure. A plurality of sprockets 28 over which the chain is looped are provided to obtain a mechanical advantage.

The boom structure 13 can consist of two or more sections. As shown, it consists of a main or outer section 31 and an inner boom section 32. Means is provided for extending the inner boom section with respect to the outer boom section and consists of a gear motor 33 mounted on the outer boom section which drives a sprocket 34. The sprocket 34 drives an elongate element or chain 36 which has its ends affixed to the inner boom section 31 as shown. The chain 36 also passes over a sprocket wheel 37 mounted on the outer boom section 31. It is apparent that as a gear motor 33 is operated, the chain 36 will be driven to extend or retract the inner boom section with respect to the outer boom section.

If desired, a workman's basket 41 or like operating platform can be mounted on the outer end of the inner boom section 32 as shown in the drawing. A suitable control switch 42 such as that shown in my Patent No. 2,841,659 can be mounted in the workman's basket to permit control of the lifting equipment by the operator in the workman's basket. Suitable control means can also be provided for operation of the lifting equipment from the ground and can consist of a movable control box 43 which is provided with a flexible cable so that it can be moved about.

The control switch 42 and the control box 43 contain various switches which are utilized in the control of the lifting equipment. These switches together with other switches hereinafter described are listed in the chart below to show their function.

Limit switches LS-3, LS-4 and LS-5 are mounted on a support member 47 which is attached to a bracket 48 forming a part of the load supporting structure 12. Limit switch LS-3 serves to limit the maximum upward movement of the boom structure and is adapted to be engaged by the tail 27 of the boom structure. Switch LS-5 serves a similar function and merely provides a back-up for limit switch LS-3 in case limit switch LS-3 fails to operate. Limit switch LS-5 is also adapted to be operated by the tail of the boom structure.

Limit switch LS-4 serves to limit the maximum downward movement of the boom structure and is operated whenever the chain 26 becomes slack. The switch LS-4 is operated by an arm 49 which is pivoted at 51 to the support member 47. The arm is provided with adjustable contact means 52 which is adapted to engage the limit switch LS-4. The arm 49 at its outermost extremity is provided with a feeler member 53 which engages the chain 26. The feeler member 53 is continuously urged into engagement with the chain 53 by a spring 54 which has one end fixed to the arm 49, and the other end fixed to the support member 48. When the chain 26 is taut, the limit switch LS-4 is not operated. As soon as the chain becomes slack, the spring 54 causes operation of the limit switch.

Control means has been provided to limit the counterclockwise and clockwise rotation of the boom structure, the raising and lowering of the outer end of the boom structure, and the extension and retraction of the boom structure. The means for limiting the rotation of the boom structure consists of a switch F mounted on the supporting bracket 48 and which is actuated by an azimuth cam 56. The azimuth cam is provided with two raised portions 56a and 56b which are normally positioned so that they are at right angles to the center line of the vehicle. The raised portions of the azimuth cam are adapted to engage a cam follower 57 which is pivoted at 58 and which is adapted to actuate operating arms 59 and 61 of the switch F. The control switch F is provided with a plurality of normally closed contacts which are adapted to be opened by the operating arms 59 and 61. The switch includes sets of contacts which are labelled F1, F1A, F2, F2A, F3 and F4. Each set of contacts consists of two pairs of contacts as shown. Both pairs of contacts for each set are opened simultaneously.

The means for controlling the raising and lowering of the boom structure consists of a switch G which is operated by an elevation cam 63 mounted on and affixed to

|  | Out | In | Up | Aux. Up | Down | C.W. | C.C.W. |
| --- | --- | --- | --- | --- | --- | --- | --- |
| Limit Switches | LS-1 | LS-2 | LS-3 | LS-5 | LS-4 | | |
| Control Sw., ground | CS-1 | CS-2 | CS-3 | | CS-4 | CS-5 | CS-6. |
| Control Sw., basket | CS-1A | CS-2A | CS-3A | | CS-4A | CS-5A | CS-6A. |

As can be seen from the chart, the ground control box 43 contains switches designated as CS-1, CS-2, CS-3, CS-4, CS-5 and CS-6. The control switch 42 in the workman's basket contains companion switches which perform the same function as the corresponding switches on the ground, and for that reason they have been designated as CS-1A, and so forth. All of these switches are adapted to be manually operated.

As will be noted from the chart, certain limit switches are also included in the control. Limit switch LS-1 is carried by the outer boom section 31 and is adapted to be engaged by a boat-shaped cam member 46 carried by the inner boom section. The limit switch LS-1 serves to limit the maximum extension of the inner boom section 32. Limit switch LS-2 is also carried by the outer boom section and is also adapted to be engaged by the boat-shaped cam member 46 carried by the inner boom section and serves to limit the maximum retraction of the inner boom section with respect to the outer boom section.

the horizontal pin 23 upon which the boom structure rotates. The cam is provided with a raised portion 63a which is adapted to engage a cam follower 64 pivoted at 66. The cam follower is adapted to actuate an operating arm 67 of the switch G. As shown, switch G consists of sets of normally open contacts which are labelled G-1, G-2, G-3 and G-4. Each set also includes two pairs of contacts which are operated simultaneously. The switch G is mounted on the boom structure and moves with the boom structure.

The means of controlling the extension and retraction of the boom structure consists of a switch H which is adapted to be actuated by the cam ramp 71 mounted on the top side of the inner boom section and which extends for a substantial portion of the entire length of the boom. The cam ramp is adapted to actuate a cam follower 72 pivoted at 73. The cam follower is adapted to engage an operating arm 74 of the switch H which is adapted to engage a plurality of sets of normally open contacts labelled H-1, H-2, H-3 and H-4. Each set of contacts consists of two pairs of contacts which are opened and closed simultaneously.

Figure 9:
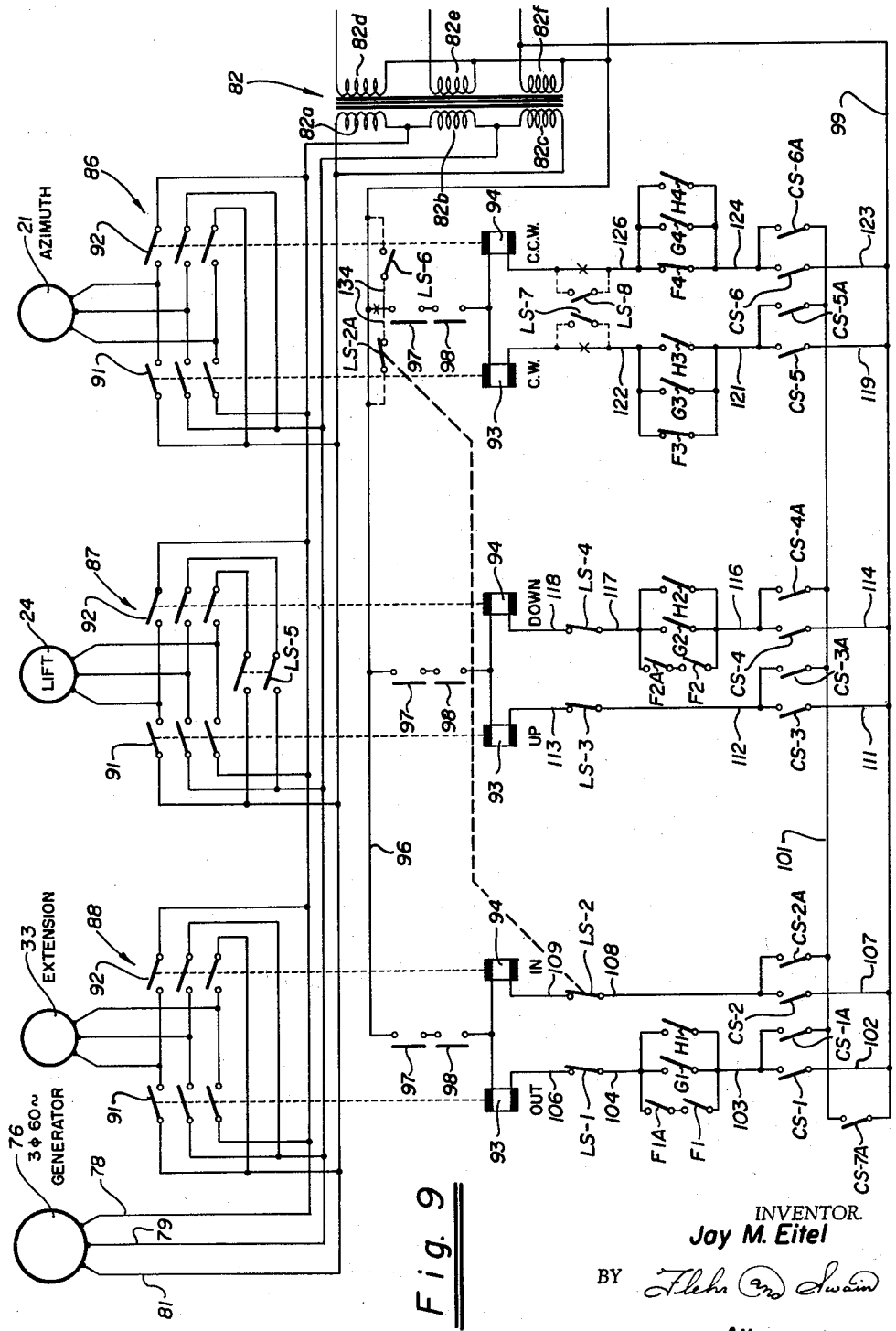
Figure 9 is a circuit diagram showing the electrical circuitry utilized in my lifting equipment.

The circuit diagram for the control system hereinbefore described as shown in Figure 9 includes the azimuth, lift and extension motors 21, 24 and 33, respectively. It also includes a suitable generator 76 such as a three-phase, 60 cycle, 220 volt generator. The generator is connected by leads 78, 79 and 81 to a transformer 82 of a suitable type such as 3 phase, 110-220 volts. The primary is provided with three windings 82a, 82b and 82c, and the secondary is also provided with three windings 82d, 82e and 82f.

The motors 21, 24 and 33 are adapted to be connected to the three phase lines 78, 79 and 81 by reversing contactor assemblies or by controllers 86, 87 and 88, respectively. The controllers are substantially identical and are provided with a plurality of switches or contactors 91 and 92 which are connected between the lines 78, 79 and 81 to the motors so that when contactors 91 are closed the motor will rotate in one direction, and when contactors 92 are closed the motor will rotate in an opposite direction. Such an arrangement is conventional and therefore, will not be described in detail. Each of the reversing controllers includes solenoids 93 and 94. Solenoid 93, as shown, serves to operate the contactors 91 to cause the motor to rotate in one direction and solenoid 94 serves to close the switches 92 to cause the motor to rotate in the opposite direction. More particularly, energization of the solenoid 93 for the reversing controller 88 will cause the extension motor 33 to be rotated in such a manner that the boom is extended, whereas when solenoid 94 is energized, the boom structure will be retracted. When the solenoid 93 for the controller 87 is energized, the lift motor 24 will be energized to raise the outer end of the boom structure, whereas when solenoid 94 for the controller 87 is energized, the boom structure will be lowered. When solenoid 93 for the controller 86 is energized, the azimuth motor 21 will cause the boom to rotate in a clockwise direction, whereas when solenoid 94 for the controller 86 is energized, the boom structure will be rotated in a counter-clockwise direction.

One side of each of the solenoids 93 and 94 is connected to a conductor 96 through overload relays 97 and 98 to one side of the secondary winding 82f of the transformer 82. The other side of the winding 82f is connected to one side of the master control switch labelled CS-7A. The other side of the master control switch is connected to a conductor 101. Conductor 99 is connected to one side of the switch CS-1 by a conductor 102, and the other side of the switch CS-1 is connected to one side of each of the switches F-1, G-1 and H-1 by conductor 103. Switch F-1 is connected in series with switch F-1A. Switch F-1A, G-1 and H-1 are connected to one side of the switch LS-1 by conductor 104, and the other side of the switch LS-1 is connected to one side of the solenoid 93 for the reversing controller 88 by conductor 106.

One side of switch CS-1A is connected to the conductor 101, and the other side of the switch is connected to conductor 103 as shown. Switch CS-2 has one side connected to the conductor 99 by conductor 107. The other side of the switch is connected to one side of the switch LS-2 by conductor 108, and the other side of switch LS-2 is connected to solenoid 94 by a conductor 109. Switch CS-2A has one side connected to conductor 101, and has the other side connected to the conductor 108. Switch CS-3 has one side connected to the conductor 99 by conductor 111, and has the other side connected to one side of a limit switch LS-3 by a conductor 112. The other side of the limit switch LS-3 is connected to the solenoid 93 for the reversing controller 87 by a conductor 113. Switch CS-3A has one side connected to the conductor 101 and has the other side connected to the conductor 112. Switch CS-4 has one side connected to conductor 99 by conductor 114, and has the other side connected to one side of each of the switches F-2, G-2 and H-2 by conductor 116.

Switch F-2 is connected in series with switch F-2A. Switch F-2A, switch G-2 and switch H-2 are connected to one side of the limit switch LS-4 by a conductor 117. The other side of the limit switch LS-4 is connected to the solenoid 94 for the reversing controller 87 by a conductor 118. Switch CS-4A has one side connected to conductor 101 and the other side is connected to conductor 116. Switch CS-5 has one side connected to the conductor 99 by conductor 119, and the other side of the switch is connected to one side of each of the switches F-3, G-3 and H-3 by conductor 121. The other side of the switch is connected to one side of the solenoid 93 for the reversing controller 86 by conductor 122. Switch CS-5A has one side connected to conductor 101, and the other side connected to conductor 121. Switch CS-6 has one side connected to the conductor 99 by conductor 123, and the other side is connected to one side of each of the switches F-4, G-4 and H-4 by conductor 124. The other sides of the same switches are connected to one side of the solenoid 94 for the reversing controller 86 by the conductor 126. Switch CS-6 has one side connected to the conductor 101, and has the other side connected to conductor 124.

The operation of the lifting equipment may now be briefly described as follows. When the master control CS-7A is closed, the closing of either switch CS-1 or CS-1A will cause energization of the solenoid 93 of the reversing controller 88 to cause the boom structure to be extended if the limit switch LS-1 is closed and if any of the parallel paths through switches F-1, F-1A, G-1 and H-1 are closed. With the assumption that limit switch LS-2 is closed, the boom structure will be retracted when either switch CS-2 or CS-2A is closed. As pointed out previously, the switches designated with the letter "A" indicate that these switches are operated from the workman's basket at the end of the boom structure, whereas the other switches are adapted to be operated from the ground. The switches which are adapted to be operated from the ground can be operated independently of the master control switch CS-7A because they are directly connected to the line 99.

In the same manner when either CS-3 or CS-3A is operated, the lift motor 24 will be operated to raise the outer end of the boom structure. When either CS-4 or CS-4A is operated, the boom structure will be lowered.

When either CS-5 or CS-5A is operated, the boom structure will be rotated in a clockwise direction, and when either CS-6 or CS-6A is operated, the boom structure will be rotated in a counterclockwise direction.

The function of certain of the limit switches is apparent from the circuit diagram. Thus, limit switch LS-1 limits the maximum extension of the boom structure. It opens the circuit to the solenoid 93 for the reversing controller 88 when maximum permissible extension of the boom structure has been reached. Limit switch LS-2 opens the circuit to the solenoid 94 for the reversing controller 88 and limits the maximum retraction of the boom structure. In the same manner, limit switches LS-3 and LS-4 limit the maximum raising and lowering of the boom structure. Limit switch LS-5 has been provided as an auxiliary back-up for the limit switch LS-3 and serves to limit the maximum upward movement of the boom structure. As shown, when it is operated, it opens two of the lines to the contacts 92 of the reversing contactor 87.

Figure 10:
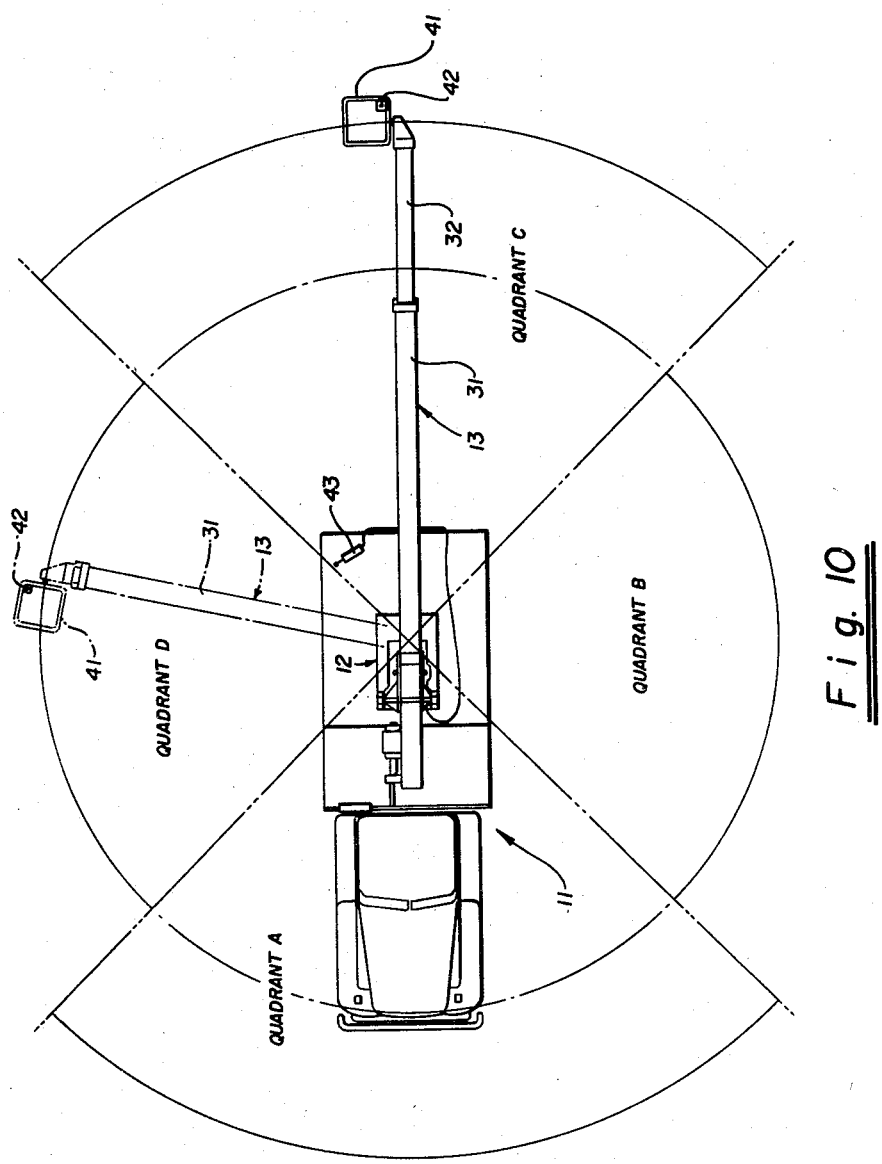
Figure 10 is a plan view showing the operation of the lifting equipment with the boom structure in various quadrants.

Now let it be assumed that the boom structure 13 is in the position shown in Figure 10. As shown, the boom structure is extending rearwardly of the truck along the center line of the vehicle. When the boom structure is in this position, it may be extended to its full length without any danger of tipping over the vehicle. The boom structure may be extended the full distance in any of the zone which is designated as quadrant C in Figure 10. The same is true when the boom is positioned in any of the zone designated as quadrant A. It will be appreciated that these safe operating zones, although they are designated and shown as quadrants, may actually be much less or more than 90° and, therefore, be sector-shaped. When the boom structure is in either one of these zones or quadrants A and C, the switch F is not operated and, therefore, its contacts remain closed.

However, now let it be assumed that it is desired to move the boom structure 13 into quadrant B from quadrant C. Also, let it be assumed that the boom structure is fully extended and is in a substantially horizontal position. As soon as the boom structure 13 is moved into this quadrant B, the raised portion 56b of the cam 56 engages the cam follower 57 of the switch F and operates it to move the operating arm 61 to open the sets of contacts F-1, F-2 and F-4.

Since switch F-3 has been moved to an open position, it is impossible to continue rotation of the boom structure in a clockwise direction into the quadrant B. Before rotation can be continued, the boom structure must be retracted to bring it into the safe operating range. Retraction of the boom structure causes the cam follower 72 to drop off of the cam ramp 71 and causes operation of the switch H to move the contacts of the switch H to the closed position. As will be noted from the circuit diagram of Figure 12, closing of the contacts H-3 establishes a circuit to the solenoid 93 for the reversing controller 86 so that it can be controlled through either the switch CS-5 or CS-5A. Therefore, as soon as the boom structure has been retracted sufficiently, rotation of the boom structure can be continued into quadrant B into the desired position. It is apparent that when the boom structure has been retracted to move the contacts of switch H to a closed position, the boom structure may be rotated through 360°.

Now let it be assumed that it is wished to again extend the boom structure to a position so that the switch H is again operated so that its contacts are in a normally open position. Extension will not be possible unless the boom structure is in one of the safe quadrants A or C, or is in the safe sector F. If the boom structure is in quadrants B and D or in sector E, as soon as the boom structure is extended, extension will be stopped as soon as switch H is operated to move its contacts to the normally open position. This is true because when the boom structure is in quadrants B and D, the switch F will be operated and its contacts will be open, and when the boom structure is in the sector E, switch G will not be operated and its contacts will be in a normally open position.

Figure 11:
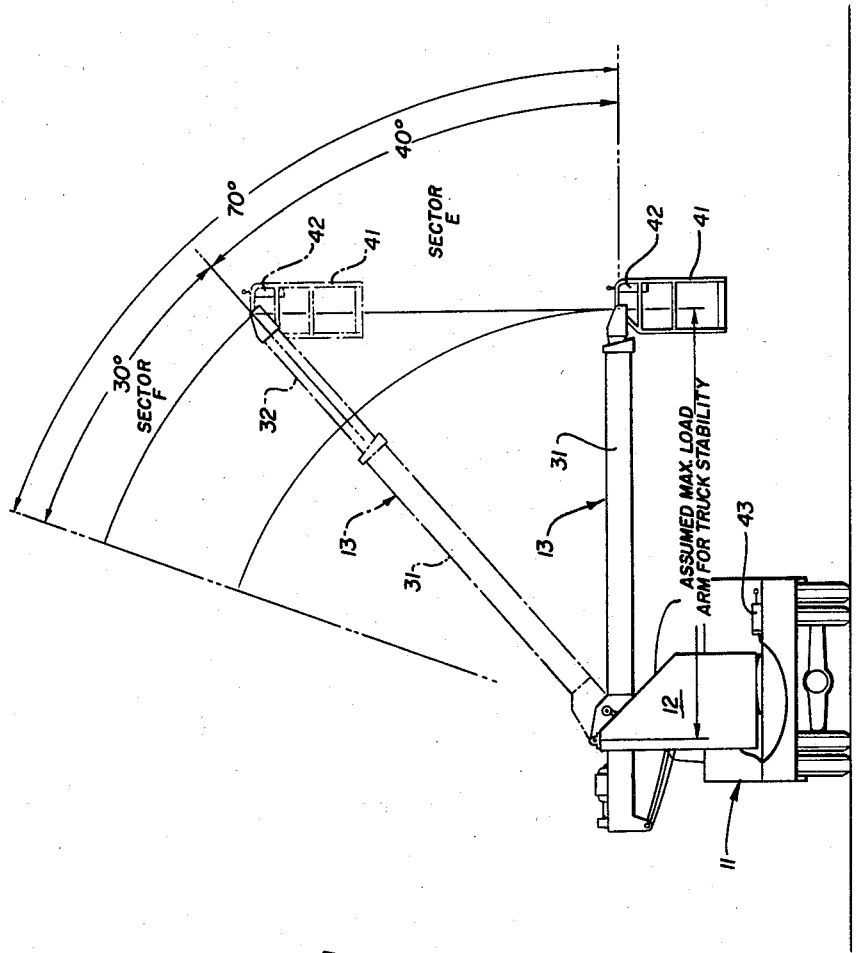
Figure 11 is a side elevational view of the lifting equipment shown in the operation of the boom structure in various sectors.

When the boom structure is raised into the sector F as shown in Figure 11, switch G is operated to close its contacts. This permits the boom structure to be extended to its full length.

The switches F-1 and F-1A, and F-2 and F-2A have been connected in series so that the solenoids to which they are connected are energized or de-energized either for clockwise or counter-clockwise rotation of the boom structure.

It, therefore, can be seen that the switches F, G and H provide means for controlling the raising and lowering, extension and retraction and rotation of the boom structure so that it is always in a safe operating range. It is apparent that the positions of the various switches F, G and H are determined by the particular type of vehicle being used, the lift supporting structure, and the load carried by the lift supporting structure. It is also apparent that for various types of equipment, the safe sectors or zones of operation may vary as to their size and position. The principle of operation, however, is identical.

It is also evident that the 360° of rotation can be divided up into more than four sections and that the angle of elevation may also be divided into more than two sectors. The more sections or sectors that are provided, the closer it is possible to come to the maximum operating range of the lifting equipment in all positions. This is true because there is a certain amount of dead space between the zones in which the equipment could be operated if means were provided so that the boom structure could be extended to its full length in all positions. However, the additional complication in the electrical circuitry and the switches required places a practical limit upon division into too many sectors.

Another embodiment of the invention is shown in Figures 12, 13 and 14, and consists of a mobile lifting equipment of the type in which the workman's basket is adapted to be lowered into a position adjacent the driving station of the vehicle as described in my copending application Serial No. 632,480, filed January 4, 1957. As will be noted from the drawing, the workman's basket must be positioned rather precisely in order to lower it into the opening 130 provided in the cab of the vehicle. Even if this portion of the cab is completely removed as described in my copending application Serial No. 632,480, filed Jan. 4, 1957, the workman's basket must still be rather precisely positioned. To facilitate the positioning of the boom structure and the workman's basket attached thereto, I have provided a limit switch LS-6 which is mounted in the bottom wall of the load supporting structure 12. The limit switch is provided with a cam follower 131 which is adapted to engage a cam ramp 132 mounted on a bracket 133 fixed to the framework 16 of the vehicle.

When such control means is provided, the limit switch LS-6 is connected in the circuit diagram of Figure 12 as shown in dotted lines across the conductor 96 and the conductor 134 leading from the solenoids 93 and 94 for the reversing contactor assembly 86. The direct connection to the line 96 is then removed as indicated by the cross. The limit switch LS-2 is provided with an extra set of contacts which is designated LS-2A and which is also connected across the conductor 134 and the conductor 96 as shown in dotted lines.

Operation of this embodiment of my invention may now be briefly described as follows. As hereinbefore described, the limit switch LS-2 is positioned in the boom structure so that it is operated when the boom structure is completely retracted. Both of the contacts LS-2 and LS-2A are of the normally closed type and are opened when the boom is completely retracted. Opening of the switch LS-2A places the control of the azimuth motor 21 under limit switch LS-6. As soon as limit switch LS-6 is operated, it is no longer possible to rotate the boom structure.

These two switches LS-2A and LS-6 greatly facilitate the rapid positioning of the boom structure 13 so that it can be lowered into a position adjacent the driving station of the vehicle. Thus, when an operator wishes to lower himself rapidly into the driving position, that is, to return the boom structure to its home position, he first operates the boom structure by means of switches CS-2 or CS-2A to retract the boom structure completely until the limit switch LS-2 and LS-2A are operated. As soon as this has been accomplished, the operator can operate the switches CS-5, CS-5A or CS-6 or CS-6A depending upon his initial position to cause clockwise or counter-clockwise rotation of the boom structure. As soon as the boom structure has been moved to a position so that the limit switch LS-6 is engaged by the cam 132, rotation of the boom structure and the workman's basket will be halted. It will be in a position immediately overlying the driving station so that it can be lowered to its home position. The limit switch LS-6 and the cam 132 are so positioned that the boom structure is halted in the proper location. After rotation of the boom structure has been halted by switch LS-6, all the operator need do is operate switch CS-4 or CS-4A to lower the workman's basket into the position adjacent the driving station. The limit switch LS-4 will automatically stop the boom at the lowermost position.

When it is desired to raise the boom structure, it is merely necessary for the operator to raise the boom structure sufficiently so that it will clear the cab of the vehicle after which he need merely extend the boom structure for a very slight distance so that the limit switch LS-2 is again operated to allow closing of its normally closed contacts. Thereafter, the operator can rotate the boom structure in any direction desired.

It is, therefore, apparent that I have provided a control means which permits rapid positioning of the boom structure at a desired location. The limit switch LS-2A does not interfere with the normal operation of the boom structure because in most operating conditions, the boom structure is slightly extended so that the limit switch LS-6 has no effect upon the operation of the lifting equipment and only comes into play when the boom structure is completely retracted.

It is apparent that restricted rotation can also be provided for the boom structure by merely positioning additional limit switches LS-7 and LS-8 in the manner limit switch LS-6 has been positioned on the load supporting structure and connecting them into the conductors 122 and 126 as shown in dotted lines in Figure 12 and breaking the conductors where the crosses are shown. In this way, the limit switches LS-7 and LS-8 will control the energization of the solenoids 93 and 94 for the contactor assembly 86.

For example, the cab of the vehicle may be so large that it is desired to prevent the tail of the boom from striking the cab. To accomplish this result, limit switches LS-7 and LS-8 may be positioned in such a manner that the boom structure cannot be rotated so that the tail of the boom will strike the cab.

It is apparent from the foregoing that I have provided a new and improved lifting equipment which includes control means for limiting the extension and retraction, raising and lowering and clockwise and counter-clockwise rotation of the boom structure so that the boom structure is always in a safe operating range to prevent accidental overturning of the vehicle. Means has also been provided whereby the boom structure may be moved to a predetermined location very rapidly and expeditiously without substantial over-travel. I have also provided means by which restricted rotation of the boom structure can be provided to prevent rotation of the boom structure into certain zones, as for example, to prevent damage to the cab of the vehicle where the cab is large.

I claim:

1. In a mobile lifting equipment of the type including a wheeled vehicle having a frame, a boom structure mounted on the frame and being of a type in which the outer end of the boom structure can be raised and lowered and in which the boom structure can be extended and retracted and rotated with respect to the vehicle, control means to prevent downward movement of the boom structure below a predetermined angle unless said boom structure is within a predetermined retracted range, and control means connected to said first named control means to prevent rotation of said boom structure into predetermined sectors unless said boom structure is within said predetermined retracted range.

2. In a mobile lifting equipment of the type including a wheeled vehicle having a frame, and a boom structure mounted on the frame and being of a type in which the boom structure is rotated about a vertical axis, raised and lowered about a horizontal axis and extended and retracted with respect to the vehicle, control means to prevent downward movement of the boom structure below a predetermined angle unless said boom structure is within a predetermined retracted range, and control means to prevent rotation of said boom structure into predetermined sectors unless said boom structure is within said predetermined retracted range, the axes of said predetermined sectors being located at right angles to the longitudinal axis of the vehicle.

3. In a mobile lifting equipment of the type including a wheeled vehicle having a frame, a load supporting structure mounted on the frame for rotation about a vertical axis, and a boom structure mounted on said load supporting structure for raising and lowering about a horizontal axis, the boom structure having at least two telescoping sections extensible with respect to each other, azimuth control means mounted on the load supporting structure and the frame of the vehicle and adapted to be operated in predetermined sectors of rotation of the load supporting structure, elevation control means mounted on the boom structure and on the means for supporting the boom structure and adapted to be operated in a predetermined sector of elevation of the boom structure, and extension control means mounted on two sections of the boom structure and adapted to be operated in a certain range of positions of said boom structure, and circuit means interconnecting said azimuth, elevation and extension control means, the elevation control means preventing downward movement of the boom structure below a predetermined angle unless said boom structure is within a predetermined retracted range, the azimuth control means preventing rotation of said boom structure into predetermined sectors unless said boom structure is within said predetermined retracted range.

4. In a mobile lifting equipment, a wheeled vehicle having a frame, a load supporting structure mounted on the frame, means for rotating the load supporting structure about a vertical axis, a boom structure mounted on the frame for rotation about a horizontal axis, means connected to the boom structure for raising and lowering the boom structure about the horizontal axis, the boom structure being comprised of at least two telescoping sections, means mounted on the boom structure for extending and retracting the sections with respect to each other, azimuth control means mounted on the load supporting structure and the frame of the vehicle and adapted to be operated in certain sectors of rotation of the load supporting structure, elevation control means mounted on the boom structure and the means for supporting the boom structure and adapted to be operated in a certain sector of elevation of the boom structure, extension control means mounted between two of the telescoping sections of the boom structure and being adapted to be operated in a certain range of operation of the boom structure, and circuit means interconnecting the azimuth control means, the elevation control means and the extension control means to the means for rotating the load supporting structure, the means for raising and lowering the boom structure and the means for extending and retracting the boom structure whereby the elevation control means prevents downward movement of the boom structure below a predetermined angle unless said boom structure is within a predetermined retracted range and the azimuth control means prevents rotation of the boom structure into predetermined sectors unless said boom structure is within said predetermined retracted range.

5. A mobile lifting equipment as in claim 4 wherein said azimuth control means, said elevation control means and said extension control means each include a cam member and a switch adapted to be operated by the cam member.

6. A mobile lifting equipment as in claim 4 together with limit control means mounted between said two telescoping sections of the boom structure, said limit control means being adapted to be operated in a completely retracted position of the boom structure, and additional azimuth control means mounted on the load supporting structure and the frame of the vehicle, the azimuth control means being adapted to be operated at a predetermined azimuth of the load supporting structure.

7. In a mobile lifting equipment, a wheeled vehicle having a frame, a boom structure mounted on the frame and being of the type in which the boom structure can be rotated, raised and lowered and extended and retracted with respect to the vehicle, limit control means mounted on the boom structure and adapted to be operated in a completely retracted position of the boom structure, and azimuth control means connected to said limit control means and adapted to be operated at a predetermined azimuth of the boom structure, the azimuth control means being effective only when said limit control means has been operated.

References Cited in the file of this patent

UNITED STATES PATENTS

| | | |
|---|---|---|
| 2,073,998 | Baby | Mar. 16, 1937 |
| 2,376,875 | Honig | May 29, 1945 |
| 2,627,560 | Eitel | Feb. 3, 1953 |
| 2,786,723 | Harsch | Mar. 26, 1957 |